(No Model.)
H. T. ATKINSON.
STREET CAR BRAKE.
No. 545,217. Patented Aug. 27, 1895.
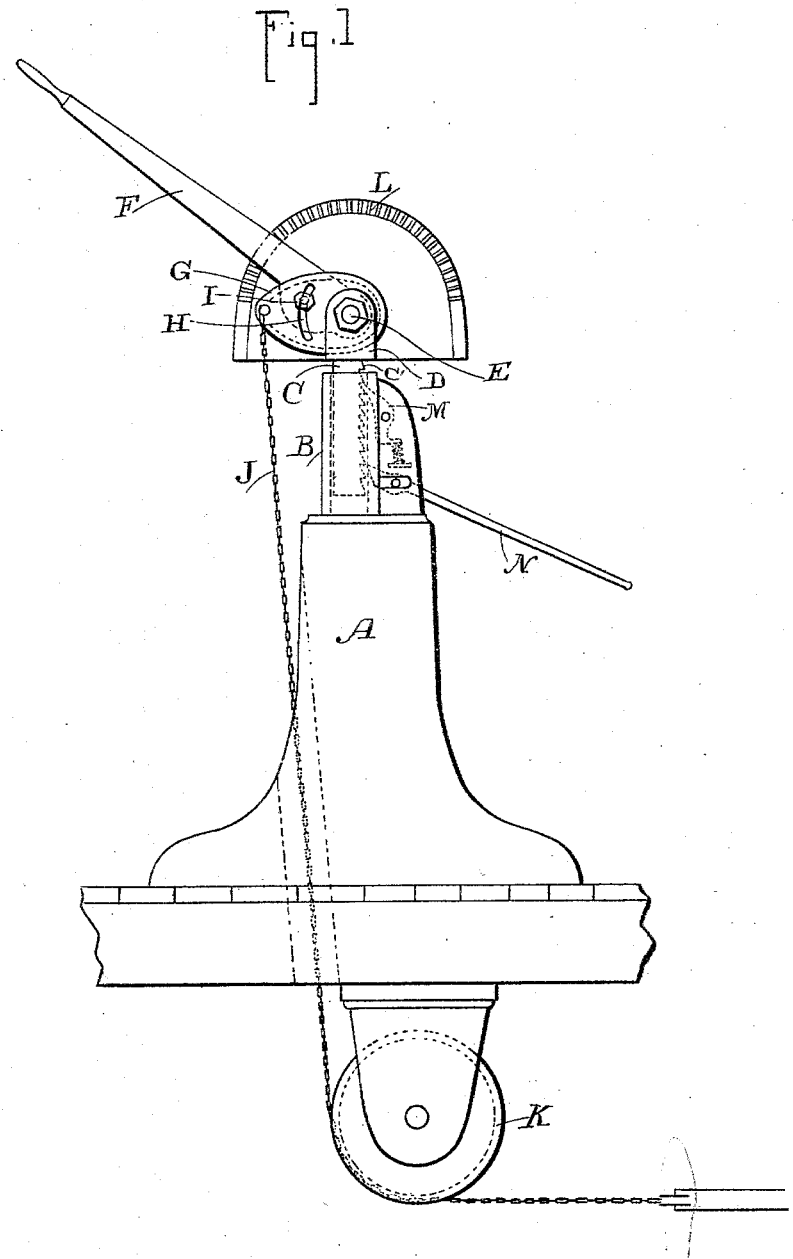
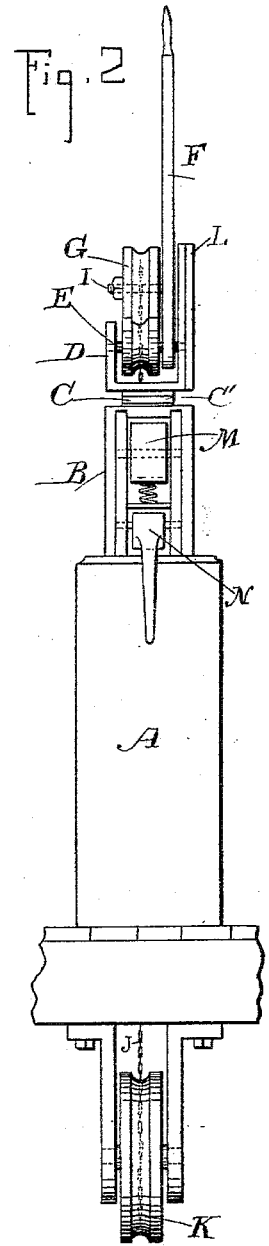
Witnesses,
Inventor,
Henry T. Atkinson
By Dewey & Co.
Att'ys

UNITED STATES PATENT OFFICE.

HENRY T. ATKINSON, OF OAKLAND, CALIFORNIA, ASSIGNOR OF FIVE-TWELFTHS TO J. E. MORRIS, OF SAME PLACE.

STREET-CAR BRAKE.

SPECIFICATION forming part of Letters Patent No. 545,217, dated August 27, 1895.

Application filed February 12, 1895. Serial No. 538,100. (No model.)

*To all whom it may concern:*

Be it known that I, HENRY T. ATKINSON, a citizen of the United States, residing in Oakland, county of Alameda, State of California, have invented an Improvement in Street-Car Brakes; and I hereby declare the following to be a full, clear, and exact description of the same.

My invention relates to a device which is especially applicable to brakes to be used upon street-cars.

It consists essentially of an adjustable mechanism whereby the power of the brake is gradually increased and the proportionate movement of the parts is lessened.

It also consists in means for taking up slack of the chain and adjusting the parts with relation to each other.

In the application of brakes to street-cars it is necessary that there should be a sufficient movement of the parts to entirely free the brake from the wheel when it is off and to promptly apply it thereto when it is desired to put the brake on. At the same time it is necessary to have a powerful leverage, so that the brake may be applied with great force with the least expenditure of manual power. It is also necessary to make such adjustments as will enable the operator to compensate any gradual lengthening or shortening of the chain and other looseness caused by wearing of the parts or by changes in the load on the car. My invention is designed to accomplish this result in a simple manner and with the use of few parts. It is applicable to various forms and arrangement of brakes, the essential features being the same in any case.

Referring to the accompanying drawings for a more complete explanation of my invention, Figure 1 is a side elevation. Fig. 2 is an edge view.

In the present construction I have shown a standard A, having an interior channel B in the upper part, and in this channel a vertically-movable post C is fitted. In the upper part of this post upwardly-projecting sides D are formed, which serve as fulcrums for the pin E, upon which the lever F is fitted to turn. This hand-lever may be of any usual or suitable description and of sufficient length to give the requisite power for the operator.

G is an elongated cam, one end of which fits and is fulcrumed upon the pin E and the other extends along the side of the lever F. This cam is slotted, as shown at H, the slot having a curvature with the pin E as its radius. Through this slot passes a bolt I, with a nut or fastening device, by which it is clamped firmly to the lever F. The object of this construction is to adjust the cam with relation to the lever F, so as to place it in the most effective position to commence and complete its work when the lever is moved about its fulcrum, and it also serves to partially adjust the parts for wear incidental to the use of the apparatus, if desired.

Around the periphery of the cam is made a groove or channel of sufficient depth to receive and guide the chain J, which has one end fixed to the cam, and the other, extending down through the base of the standard and down through the floor of the car, passes around a direction-pulley K, suitably journaled with relation to the brake mechanism. From this pulley the chain leads to and is connected with the brake-rod, so that the movement of the chain will act upon the brake in the usual manner.

L is a segmental rack, of any usual or suitable description, adapted to engage the lever F and retain it in any desired position with relation to its fulcrum-pin.

The operation will then be as follows: The cam G being first adjusted with relation to the lever, so that when the lever is in its forward position that portion of the cam which is farthest extended from the fulcrum-pin will be in position to act upon the chain, so as to move the latter with the greatest rapidity, the lever is drawn back when it is desired to apply the brake, and the slack of the chain is immediately taken up by the first rapid movements of the cam, and the brake is moved into contact with the wheels. By this time the cam will have passed beyond the center about which it is turning, and the chain rapidly approaches the fulcrum-pin by reason of the diminishing diameter of the cam around which it passes until it reaches a point very near to the fulcrum-pin, where the greatest power of the lever is applied to complete the pressure of the brake upon the wheel. The lever is latched and held in place by its engagement with the segmental rack, and when the brake is to be released it is disengaged and thrown forward, when the chain will be instantly slackened and the brake allowed to move away from the wheel to a sufficient distance to be out of contact therewith. The constant application of the brake with great power will cause an extension of the chain, brake-rod, and connecting parts, as well as a certain wear and looseness in the fulcrum-pins and various other parts. Changes in the weight of the load carried by the car also act to change the relative position of the parts and the movement of the hand-lever. In order to compensate for this variation and maintain the proper relations between the cam and these movable parts, I have shown the movable post C provided with ratchet-teeth C' upon one side. In the present case, for convenience, the teeth are shown in the plane of movement of the lever; but it will be manifest that they may be applied to either side of the vertically-moving post. In line with these teeth I have shown a pawl M, so fulcrumed that its upper end is adapted to engage with the teeth whenever the bar is raised. N is a lever fulcrumed below the pawl M, having its point so arranged as to engage the ratchet, and by lifting the outer end of the lever, pressing the point into engagement with the ratchet, then depressing the lever, the post will be raised. The pawl is normally held in contact with the ratchet-bar C by a spring or other suitable means, and whenever the bar C is raised a distance of one or more teeth of the ratchet the pawl M, engaging the teeth, will retain it in this position. The lever N is movable, so as to disengage it from the ratchet for each new engagement to raise the bar. This bar may thus be raised from time to time to compensate for changes in the load, and also for the elongation of parts, until it becomes necessary to either remove a link or two of the chain or otherwise shorten the connections, when the bar may be again lowered to its normal position by disengaging the pawl.

Having thus described my invention, what I claim as new, and desire to secure by Letters Patent, is—

1. In a street car brake, a flexible chain connected with the brake rod, a direction pulley around which it passes, a cam fulcrumed in a standard upon the car around which the chain passes, a lever with which the cam is adjustably connected, said lever being movable to draw the chain up with gradually decreasing motion and increasing power or to release it by reverse movement.

2. In a street car brake, a cam fulcrumed upon a standard fixed upon the car, a chain passing around said cam and direction pulley and connected with the brake rod, a lever fulcrumed upon the same pin with the cam and adjustably connected with the cam so that the relative positions of the two may be changed and the movement of the lever and cam caused to act upon the chain and brake with a decreasing motion and increasing power.

3. In a street car brake, a standard fixed upon the car, a lever turning about the fulcrum pin upon the standard, a grooved cam situated beside the lever, a chain passing about said cam extending downwardly and connected with the brake rod, a means for adjusting the cam with relation to the lever consisting of a segmental slot formed in the cam, a bolt passing through said slot connecting with the lever, and a nut or means for binding the two together.

4. In a street car brake, a standard fixed upon the car having a vertical channel in the upper end, a post movable in said channel having a rack formed upon one side of it, a cam and lever fulcrumed in the upper part of the post, a chain passing around the cam and connecting with the brake rod, and a pawl adapted to engage the teeth of the post and actuating mechanism whereby the post may be raised and the parts adjusted for elongation of the chain.

5. In a street car brake, a standard fixed upon the car, having a vertical channel in its upper end, a post movable in said channel with a rack formed upon one side of it, a cam and lever fulcrumed in the upper part of the post, a chain connecting the cam with the brake rod, a lever loosely fulcrumed to the standard so that its point may be engaged with or disengaged from the ratchet, to move the latter by successive impulses, and a spring-actuated pawl engaging the ratchet to retain it after having been lifted by the lever.

In witness whereof I have hereunto set my hand.

HENRY T. ATKINSON.

Witnesses:
S. H. NOURSE,
H. F. ASCHECK.